United States Patent [19]
Jeapes et al.

[11] Patent Number: 5,723,837
[45] Date of Patent: Mar. 3, 1998

[54] URANIUM HEXAFLUORIDE PURIFICATION

[75] Inventors: Andrew Philip Jeapes; Mark Fields, both of Cumbria; Gerard Sean McGrady, Oxford, all of United Kingdom

[73] Assignee: British Nuclear Fuels plc, United Kingdom

[21] Appl. No.: 656,271
[22] PCT Filed: Dec. 6, 1994
[86] PCT No.: PCT/GB94/02670
  § 371 Date: Aug. 16, 1996
  § 102(e) Date: Aug. 16, 1996
[87] PCT Pub. No.: WO95/15921
  PCT Pub. Date: Jun. 15, 1995
[51] Int. Cl.$^6$ .............. B01D 53/00; C01G 43/00; G21C 1/00; B01J 19/08
[52] U.S. Cl. .............. 204/157.3; 204/157.41; 423/253; 423/258; 422/159; 422/186
[58] Field of Search .............. 204/157.3, 157.41, 204/157.44; 423/253, 258; 422/159, 186

[56] References Cited

U.S. PATENT DOCUMENTS 4,555,318  11/1985  Beitz .............. 204/157.1 R

OTHER PUBLICATIONS

Beitz et al., "Photochemical Removal of Neptunium Hexafluoride and Plutonium Hexafluoride from Uranium Hexafluoride Gas Streams", Transuranium Elem. Symp., Meeting Date 1990, 168–180, ?, 1992.

*Primary Examiner*—Kathryn L. Gorgos
*Assistant Examiner*—Edna Wong
*Attorney, Agent, or Firm*—Sheridan Ross P.C.

[57] ABSTRACT

A method of purifying a UF$_6$ gas stream which comprises irradiating the UF$_6$ gas stream with laser radiation in a vessel in order to selectively convert fluoride impurities in the gas stream to involatile products, removing the purified UF$_6$ gas stream from the vessel and separately removing the impurities from the vessel.

25 Claims, 3 Drawing Sheets

URANIUM HEXAFLUORIDE PURIFICATION

This is a national stage application of PCT/GB94/02670 filed Dec. 6, 1994.

BACKGROUND OF THE INVENTION

This invention relates to the purification of gaseous uranium hexafluoride ($UF_6$) and, more particularly, to the removal of fluoride impurities from a $UF_6$ gas stream.

In the reprocessing of irradiated nuclear reactor fuel to produce a recycled uranium feedstock which is fluorinated to yield $UF_6$, a number of impurities are usually present which, upon fluorination of the feedstock, can form fluorides with volatilities similar to that of $UF_6$. For example, a feedstock deriving from irradiated commercial nuclear reactor fuel contains the transuranic elements Np, Pu and Am as well as the transition elements Tc, Rh and Ru. The transuranic elements typically constitute about 0.95 weight percent on a metals basis and the aforementioned transition elements constitute about 0.38 weight percent. Uranium is usually present at a level of about 96 weight percent.

While the fluorides of the aforementioned transition elements generally have volatilities sufficiently different from that of $UF_6$ to permit separation by fractional distillation, the fluorides neptunium hexafluoride ($NpF_6$) and plutonium hexafluoride ($PuF_6$) do not, and consequently remain in the $UF_6$ gas stream following processing by fractional distillation.

Previously known methods for the removal of fluoride impurities from a uranium feedstock arising from irradiated nuclear reactor fuel have involved a number of techniques. In some instances the feedstock has been contacted with an aqueous solution prior to the formation of $UF_6$. This has the disadvantage of resulting in an increase in the volume of radioactive waste. In other instances, alkali metal fluorides have been employed to separate the impurities by selective sorption. Such a process again leads to an increase in radioactive waste products.

Other known processes include that described in U.S. Pat. No. 4,364,906 in which calcium carbonate has been used as a trapping agent to purify a $UF_6$ gas stream. However, such a method tends to produce large volumes of waste products. U.S. Pat. No. 3,806,579 describes the distillation of impurities of $MoF_6$ and $WF_6$ from $UF_6$. U.S. Pat. No. 4,311,678 describes the use of a brominating agent to remove deposits of $UF_6$ hydrolysis products from apparatus in which $UF_6$ is handled. Such a process would result in the loss of some $UF_6$ as well as the impurities. A somewhat more successful technique is disclosed in U.S. Pat. No. 4,555,318 in which a $UF_6$ gas stream is contacted with a bed of solid $UF_5$. The technique relies on the reduction of gaseous $NpF_6$ by $UF_5$ to remove the impurity, thereby creating solid $NpF_5$ in the process. It is indicated that this process is not an efficient one and it is likely that the required reduction and removal of the impurity is not the only process which occurs. A similar approach is described in European Patent numbers 0 087 358 and 0 088 006 in which $PbF_2$ and $CoF_2$ are employed in a manner analogous to that described for $UF_5$. The use of a solid fluoride bed to remove impurities will necessarily create large volumes of solid wastes which must subsequently be treated. It is also known that the use of $CoF_2$ is not a particularly efficient method for the removal of $NpF_6$. Both of these methods suffer from the disadvantages of poor efficiency and high waste production.

SUMMARY OF THE INVENTION

It is an object of the present invention to provide a method for the purification of a $UF_6$ gas stream without a concomitant increase in the volume of waste products.

According to a first aspect of the present invention there is provided a method of purifying a $UF_6$ gas stream, the method comprising irradiating the $UF_6$ gas stream with laser radiation in a vessel in order to selectively convert fluoride impurities in the gas stream to involatile products, removing the purified $UF_6$ gas stream from the vessel and separately removing the impurities from the vessel.

The fluoride impurities in the $UF_6$ gas stream may comprise $NpF_6$ and $PuF_6$.

It is known that each of the molecules $UF_6$, $NpF_6$ and $PuF_6$ exhibits a broad intense absorption in the region above energies of about 20,000 $cm^{-1}$ as illustrated below and that the molecules dissociate at energies in the region 30,000 $cm^{-1}$ to 20,000 $cm^{-1}$ also as illustrated below. In addition, however, the molecules $NpF_6$ and $PuF_6$ absorb into discrete transitions at energies below about 20,000 $cm^{-1}$; notably around 10,000 $cm^{-1}$ to 7,000 $cm^{-1}$ for $NpF_6$ and around 13,000 $cm^{-1}$ to 9,000 $cm^{-1}$ for $PuF_6$. Therefore, there exists the possibility of selectively exciting $NpF_6$ and $PuF_6$ molecules by laser irradiation in order to effect their separation from the $UF_6$ gas stream.

Preferably, the $UF_6$ gas stream is irradiated with laser radiation in three different wavelength bands, eg from three separate laser sources, in order to selectively excite the $NpF_6$ and $PuF_6$ impurities.

Desirably, a combination of laser energies may be chosen so that the $NpF_6$ and $PuF_6$ impurities in the $UF_6$ gas stream each absorb two photons from the radiation field so that $NpF_6$ and $PuF_6$ molecules are excited above their dissociation thresholds and thereby dissociate into involatile lower fluorides and fluorine atoms. The $UF_6$ molecules are not dissociated by the radiation field.

The $UF_6$ gas stream is preferably irradiated with laser radiation in two stages: in a first stage the $NpF_6$ and $PuF_6$ molecules are excited by a laser radiation field having energies in the range 10,000 $cm^{-1}$ to 7,000 $cm^{-1}$ and 13,000 $cm^{-1}$ to 9,000 $cm^{-1}$ respectively and, more preferably, by laser radiation having energies of 9528 $cm^{-1}$ and 9583 $cm^{-1}$ respectively; in a second stage the $NpF_6$ and $PuF_6$ molecules are excited with laser radiation having an energy in the range 17,500 $cm^{-1}$ to 24,000 $cm^{-1}$ and more preferably, laser radiation having an energy of 19,570 $cm^{-1}$, the two stage irradiation thereby exciting the $NpF_6$ and $PuF_6$ molecules above their dissociation thresholds so as to dissociate the said molecules into involatile products comprising lower fluorides which deposit in the vessel as solids.

The energy of the laser radiation in the second stage may be advantageously of an energy such that the radiation is not absorbed by $UF_6$ molecules and the $UF_6$ gas thereby remains unaffected.

Conveniently, in the first laser irradiation stage, the $NpF_6$ and $PuF_6$ molecules may be respectively irradiated by two (separate) solid state lasers and, preferably, the lasers may be $Nd^{3+}$-doped solid state lasers. More preferably, the $NpF_6$ molecules may be irradiated by a $Nd^{3+}$-doped fluorozirconate laser or a $Nd^{3+}$-doped aluminium fluoride glass laser, whereas the $PuF_6$ molecules may be irradiated by a $Nd^{3+}$-doped fluoroberyllate glass laser.

In the second laser irradiation stage, the $NpF_6$ and $PuF_6$ molecules may be conveniently irradiated by radiation from a copper vapor laser or a high power argon-ion laser.

Advantageously, removal of the involatile products from the vessel may be effected by contacting the said products with one or more suitable fluorinating agents to form gaseous products. Chemical fluorinating agents may be used and suitable chemical fluorinating agents may include $IF_7$, BrF$_3$ and ClF$_3$. As an alternative, photochemical fluorinating agents may be used in conjunction with irradiation from a source of ultraviolet energy to form gaseous products. Suitable photochemical fluorinating agents may include F$_2$ and ClF.

According to another aspect of the present invention there is provided a system for the purification of a UF$_6$ gas stream by the method of the first aspect, the system comprising a reaction vessel, a source of unpurified gaseous UF$_6$, a source of a gaseous fluorinating agent, for example, fluorine, means for admitting said unpurified UF$_6$ and said fluorinating agent into the reaction vessel, means for irradiating the contents of the reaction vessel, means for allowing gases to exit the reaction vessel, means for separating the gases exiting the reaction vessel, and means for collecting the separated gases.

Preferably, the contents of the reaction vessel may be irradiated by a combination of laser and ultraviolet sources.

Conveniently, the reaction vessel may have a window which is optically transparent to the energies of the laser and ultraviolet radiation from the sources.

Advantageously, a number of the said systems may be cascaded in series in order to produce high purity UF$_6$.

A further advantage would be that sections of a cascaded system could be switched out of the process during maintenance and to allow the removal of accumulated impurities.

The method of the present invention is particularly beneficial in the purification of a UF$_6$ gas stream avoiding the need for wet chemical processing and without the generation of large volumes of waste products which require subsequent treatment and/or storage.

It has been recognised in U.S. Pat. No. 4,670,239 that it is possible to photodissociate PuF$_6$ directly to PuF$_5$ using visible radiation. However, the photodissociation has not been used to separate PuF$_6$ gas from other species but simply as a method for the preparation of PuF$_5$.

BRIEF DESCRIPTION OF THE DRAWINGS

Embodiments of the present invention will now be described, by way of example only, with reference to the accompanying drawings, in which.

DESCRIPTION OF THE PREFERRED EMBODIMENTS

Figure 1:
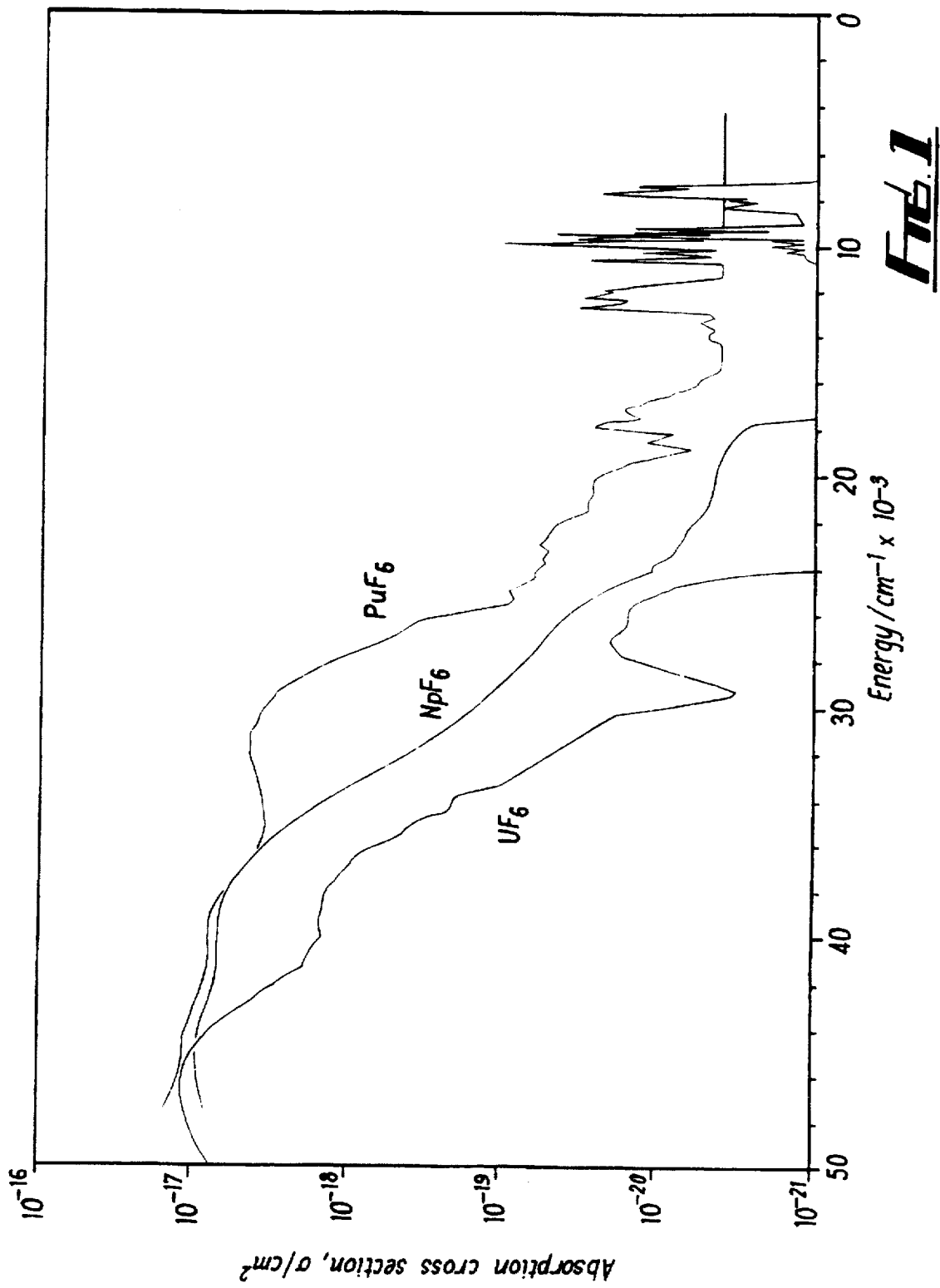
FIG. 1 is a graph of energy versus absorption cross section showing absorption spectra of the molecules UF$_6$, NpF$_6$ and PuF$_6$.
Figure 2:
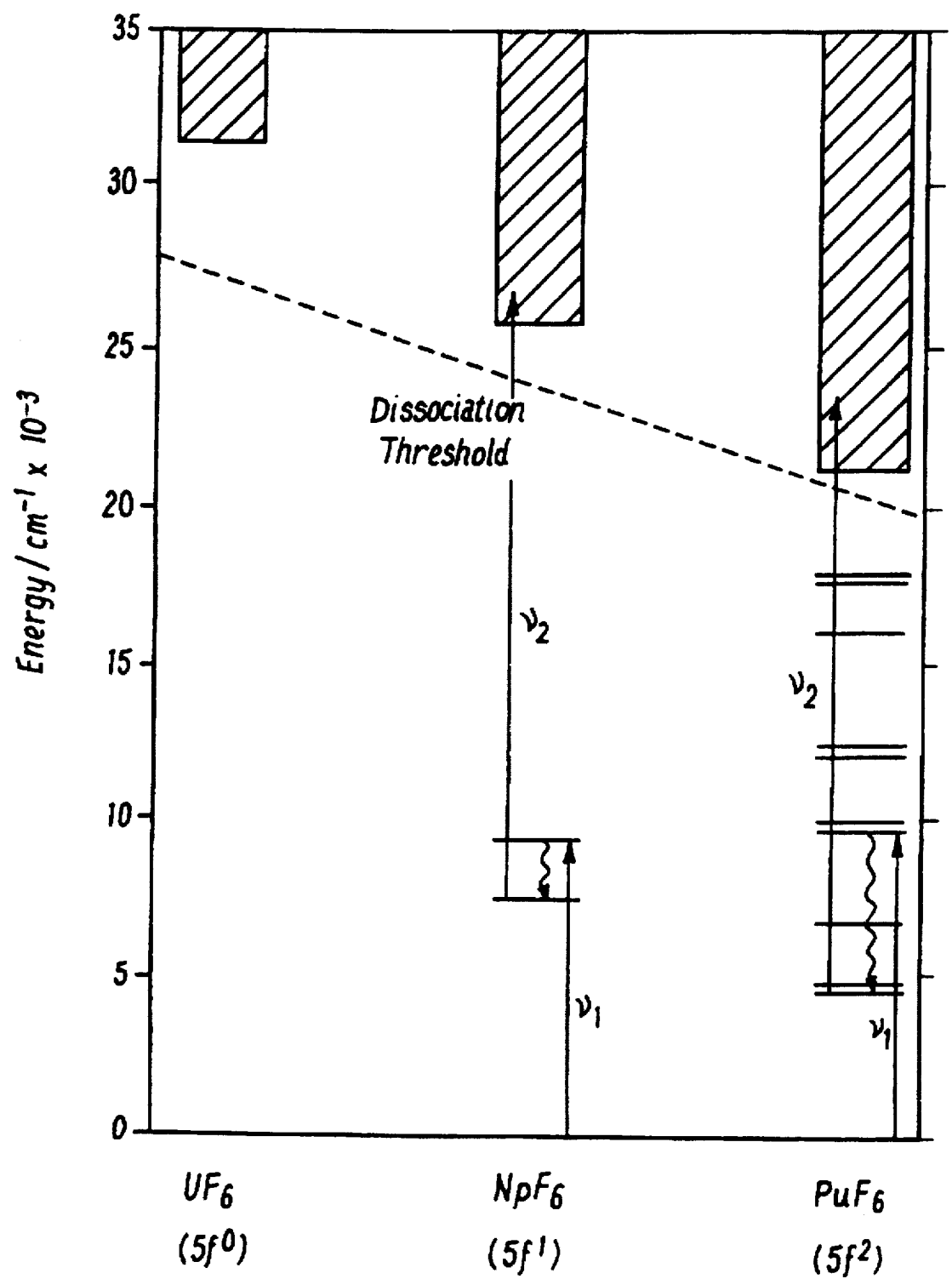
FIG. 2 shows a schematic representation of the absorption of the molecules UF$_6$, NpF$_6$ and PuF$_6$.

Referring now to FIG. 1, the absorption spectra of the molecules UF$_6$, NpF$_6$ and PuF$_6$ are shown in the region 50000 cm$^{-1}$ to 5000 cm$^{-1}$. FIG. 2 shows the absorption of each of the aforementioned molecules represented schematically along with their measured dissociation energies. As can be seen, each of the molecules exhibits a broad, intense absorption in the region above about 20,000 cm$^{-1}$, and the molecules dissociate at energies in the region 30,000 cm$^{-1}$ to 20,000 cm$^{-1}$. In addition, as shown in FIG. 2, the molecules NpF$_6$ and PuF$_6$ absorb into discrete transitions at energies below 20,000 cm$^{-1}$ (notably 10,000 cm$^{-1}$ to 7,000 cm$^{-1}$ for NpF$_6$ and 13,000 cm$^{-1}$ to 9,000 cm$^{-1}$ for PuF$_6$).

Figure 3:
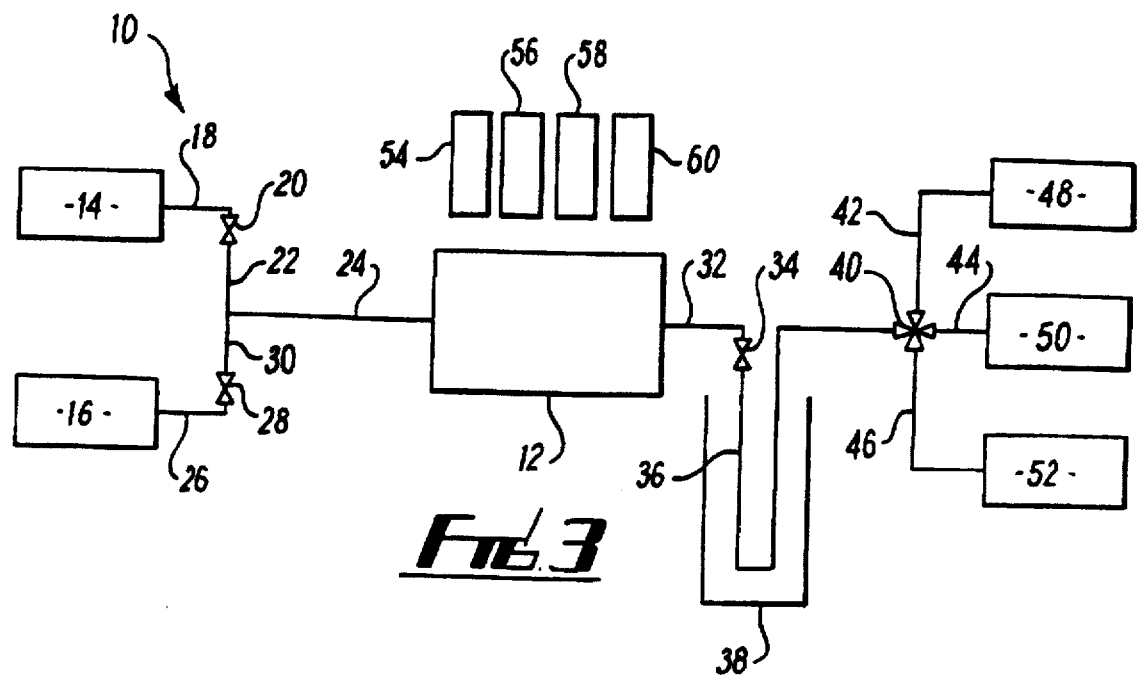
FIG. 3 shows a schematic representation of a system for the purification of a UF$_6$ gas stream.

Referring now to FIG. 3, a system 10 is shown for the purification of a UF$_6$ gas stream making use of the absorption characteristics of NpF$_6$ and PuF$_6$. In the system 10, a reaction vessel 12 is supplied with unpurified UF$_6$ gas from a source 14 and fluorine gas from a source 16. The UF$_6$ source 14 is connected by a line 18 to a valve 20 having a line 22 to an inlet line 24 which is connected to the reaction vessel 12. The fluorine source 16 is connected by a line 26 to a valve 28 having a line 30 to the inlet line 24.

An outlet line 32 connects the reaction vessel 12 to a valve 34. A line 36 extends from the valve 34 and passes through a cold trap 38 to connect with a four-way valve 40. The valve 40 connects with a further three lines 42, 44 and 46 which respectively connect the valve 40 to three reservoirs 48, 50 and 52.

Located in close proximity to one end of the reaction vessel 12 are three laser radiation sources 54, 56 and 58, and a source of ultraviolet radiation 60.

Figure 4:
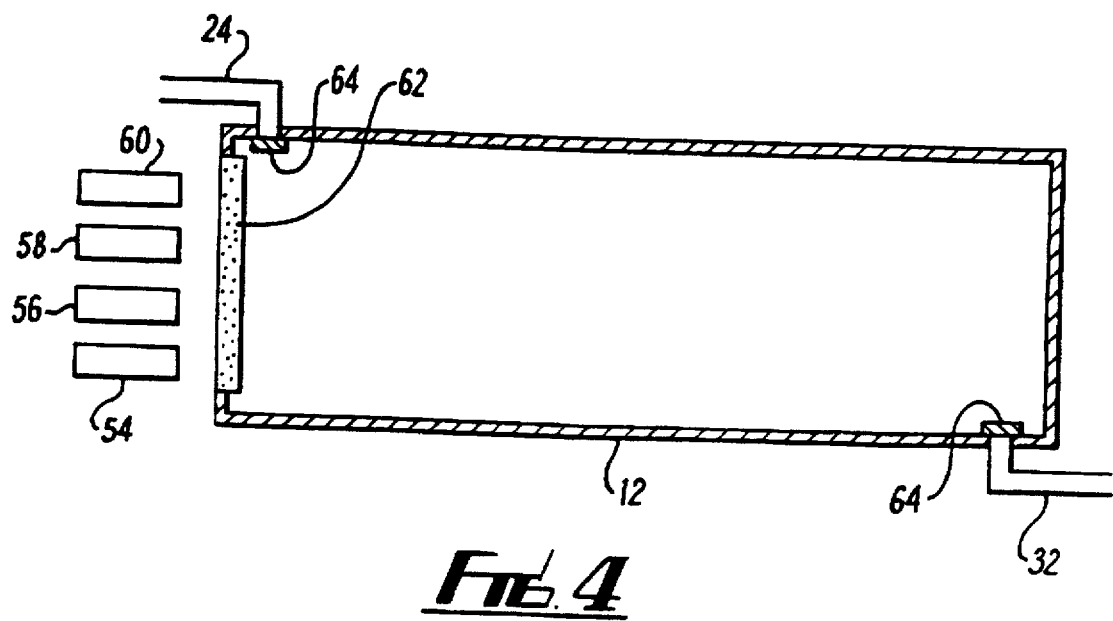
FIG. 4 shows, to an enlarged scale, a part sectional view of part of the system of FIG. 3.

As shown in FIG. 4 the reaction vessel 12 is connected to the inlet line 24 near to one of its ends and to the outlet line 32 near to its other end. The reaction vessel 12 is made of a material such as nickel or monel which is resistant to UF$_6$. One end of the reaction vessel 12 has a window 62 made from a material which is optically transparent to the energies of the laser and ultraviolet radiation from the sources 54, 56, 58, 60. A suitable material for the window 62 is magnesium fluoride. The reaction vessel 12 serves as a photolysis cell in which radiation from the sources 54, 56, 58, 60 passes through the window 62 to contact with material in the reaction vessel 12. At the connections to the inlet line 24 and to the outlet line 32, the reaction vessel 12 is provided with filters 64 which serve to protect the external gas circuit from any particulate matter produced in the reaction vessel 12.

In operation of the system 10 of FIG. 3, valves 20 and 28 are initially closed, valve 34 is in an open position and valve 40 is operated so as to connect lines 36 and 42. Unpurified UF$_6$ is admitted to the reaction vessel 12 by opening valve 20 so that a UF$_6$ gas stream flows from the UF$_6$ source 14 through lines 18, 22 and 24 into the vessel 12. In the reaction vessel 12, unpurified UF$_6$ is subjected to irradiation from the laser sources 54, 56 and 58, the laser radiation passing into the vessel 12 through the window 62 (see FIG. 4). A combination of laser energies is chosen so that the NpF$_6$ and PuF$_6$ impurities in the UF$_6$ gas stream each absorb two photons from the radiation field. In this way the NpF$_6$ and PuF$_6$ molecules are excited above their dissociation thresholds and thereby dissociate into involatile lower fluorides and fluorine atoms. The UF$_6$ molecules are unaffected by the radiation field.

The laser irradiation is carried out in two stages. In the first stage NpF$_6$ molecules are excited by laser radiation having an energy of 9528 cm$^{-1}$ from a Nd$^{3+}$-doped fluorozirconate laser 54 (or a Nd$^{3+}$-doped aluminium fluoride glass laser), and PuF$_6$ molecules are excited by laser radiation having an energy of 9583 cm$^{-1}$ from a Nd$^{3+}$-doped fluoroberyllate glass laser 56. In the second stage the NpF$_6$ and PuF$_6$ molecules are excited with laser radiation having an energy of 19,570 cm$^{-1}$ from a copper vapor laser 58. The laser irradiation causes decomposition of the NpF$_6$ and PuF$_6$ into lower valency fluorides, which are deposited in the vessel 12 as involatile solids, and fluorine gas.

The UF$_6$ gas stream which is now free from Np and Pu impurities, but which contains fluorine gas from the photochemical reaction, is fed via lines 32 and 34 through the cold trap 38 in which the UF$_6$ condenses. The fluorine, which does not condense in the cold trap 38, passes through lines 36 and 42 into the reservoir 48 where it is collected. To remove the purified $UF_6$ from the cold trap 38, valve 34 is closed and valve 40 is operated so as to connect lines 36 and 44. The cold trap 38 is warmed to a temperature at which $UF_6$ volatilises (approximately 57° C.) and the purified $UF_6$ is collected in the reservoir 50.

Periodically, valve 20 is closed to interrupt the flow of unpurified $UF_6$ gas from the source 14 to the reaction vessel 12. Purified $UF_6$ and fluorine are removed from the reaction vessel 12 to the reservoirs 48 and 50 respectively in the manner described hereinbefore. Valve 28 is opened and fluorine gas is fed into the reaction vessel 12 from the fluorine source 16 via lines 26, 30 and 24. The reaction vessel 12 and its contents are irradiated by the ultraviolet source 60, the ultraviolet radiation passing into the vessel 12 through the window 62. The involatile solid impurities in the vessel 12 are thereby photochemically fluorinated to $NpF_6$ and $PuF_6$. Valve 40 is operated so as to connect lines 36 and 42 and valve 34 is now opened. The gases leaving the reaction vessel 12 are fed via lines 32 and 36, through the cold trap 38 where the $NpF_6$ and $PuF_6$ condense. Any unreacted fluorine does not condense in the cold trap 38 and passes through lines 36 and 42 into the reservoir 48 where it is collected. To remove the $NpF_6$ and $PuF_6$ from the cold trap 38, valve 34 is closed and valve 40 is operated so as to connect lines 36 and 46. The cold trap 38 is warmed to a temperature at which the $NpF_6$ and $PuF_6$ volatilise (approximately 60° C.) and they are then collected in the reservoir 52.

In order to achieve the economical removal of impurities from a $UF_6$ gas stream to produce purified $UF_6$ of an acceptable quality for use in gaseous diffusion plants, it may be necessary to cascade several of the hereinbefore described systems in series. Cascading would have the additional advantage of enabling sections of the overall system to be switched out of the process during maintenance and during the periodic removal of accumulated impurities.

In an alternative method of purifying a $UF_6$ gas stream $NpF_6$ and $PuF_6$ may be dissociated independently and are collected in separate reservoirs. Although $PuF_6$ can be photodissociated in a two-photon process as described above, the dissociation can be carried out more simply using a single photon process.

In the alternative method $PuF_6$ molecules in the gas stream are photodissociated in a reactor using laser radiation of a relatively low energy such that the irradiation has no effect on the $UF_6$ and $NpF_6$ molecules. The involatile solid fluoride product can then be collected and treated as required. The $UF_6$ gas stream containing the $NpF_6$ impurity passes into a second reactor in which the $NpF_6$ is excited and photodissociated using the two-photon process as described above. The second involatile solid photoproduct is collected and treated as required and the purified $UF_6$ gas stream passes to a reservoir for collection.

We claim:

1. A method of purifying a $UF_6$ gas stream containing $UF_6$ molecules having fluoride impurities, the method comprising irradiating the $UF_6$ gas stream with laser radiation in a vessel in order to selectively convert at least a portion of the fluoride impurities in the gas stream to involatile products, removing the purified $UF_6$ gas stream from the vessel and separately removing the impurities from the vessel, said $UF_6$ gas stream being irradiated with the laser radiation having a frequency range of below about 24,000 $cm^{-1}$.

2. A method as in claim 1 wherein said at least a portion of the fluoride impurities in the $UF_6$ gas stream comprise $NpF_6$ or $PuF_6$ or both.

3. A method as in claim 2 wherein a combination of laser energies is employed so that the $NpF_6$ and $PuF_6$ impurities in the $UF_6$ gas stream each absorb two photons from said laser radiation so that $NpF_6$ and $PuF_6$ molecules are excited above their dissociation thresholds and dissociate into involatile lower fluorides and fluorine atoms.

4. A method as in claim 2 wherein the $UF_6$ gas stream is irradiated with the laser radiation in two stages to excite $NpF_6$ and $PuF_6$ molecules above their dissociation thresholds to dissociate the said molecules into involatile products comprising lower fluorides.

5. A method is in claim 4 wherein, in a first stage, the $NpF_6$ and $PuF_6$ molecules are excited by a laser radiation field having energies in the range of 10000 $cm^{-1}$ to 7000 $cm^{-1}$ and 13000 $cm^{-1}$ to 9000 $cm^{-1}$ respectively.

6. A method as in claim 5 wherein the $NpF_6$ and $PuF_6$ molecules are excited by the laser radiation having energies of 9528 $cm^{-1}$ and 9583 $cm^{-1}$ respectively.

7. A method as in claim 5 wherein the $NpF_6$ and $PuF_6$ molecules are respectively irradiated by two separate solid state lasers.

8. A method as in claim 7 wherein the lasers are $Nd_3+$-doped solid state lasers.

9. A method as in claim 8 wherein the $NpF_6$ molecules are irradiated by a $Nd_3+$-doped fluorozirconate laser or a $Nd_3+$-doped aluminum fluoride glass laser, and the $PuF_6$ molecules are irradiated by a $Nd_3+$-doped fluoroberyllate glass laser.

10. A method as in claim 5 wherein, in a second stage, the $NpF_6$ and $PuF_6$ molecules are excited with the laser radiation having an energy in the range of 17500 $cm^{-1}$ to 24000 $cm^{-1}$.

11. A method as in claim 10 wherein the $NpF_6$ and $PuF_6$ molecules are excited with laser radiation having an energy of 19570 $cm^{-1}$.

12. A method as in claim 10 wherein the laser radiation is of an energy such that the radiation is not absorbed by $UF_6$ molecules and the $UF_6$ gas remains unaffected.

13. A method as in claim 10 wherein the $NpF_6$ and $PuF_6$ molecules are irradiated by radiation from a copper vapor laser or a high power argon-ion laser.

14. A method as in claim 1 or claim 2 wherein the $UF_6$ gas stream is irradiated with the laser radiation in three different wavelengths bands, from three separate laser sources, to excite selectively the $NpF_6$ and $PuF_6$ impurities.

15. A method as in claim 1 wherein removal of the involatile products from the vessel is effected by contacting the said products from the vessel with one or more fluorinating agents to form gaseous products.

16. A method as in claim 15 wherein the fluorinating agents are chemical fluorinating agents.

17. A method as in claim 16 wherein the chemical fluorinating agents include $IF_7$, $BrF_3$ and $ClF_3$.

18. A method as in claim 15 wherein photochemical fluorinating agents are used in conjunction with irradiation from a source of ultraviolet energy to form gaseous product.

19. A method as in claim 18 wherein the photochemical fluorinating agents include F2 and ClF.

20. A system for the purification of a $UF_6$ gas stream comprising a reaction vessel, a source of unpurified gaseous $UF_6$, a source of a gaseous fluorinating agent, means for admitting said unpurified $UF_6$ and said fluorinating agent into the reaction vessel, means for irradiating said unpurified $UF_6$ and said fluorinating agent in the reaction vessel, wherein said irradiating means generate laser radiation having a frequency in the range of below about 24,000 $cm^{-1}$, means for allowing gases to exit the reaction vessel, means for separating the gases exiting the reaction vessel, and means for collecting the separated gases.

21. A system as in claim 20 wherein said unpurified $UF_6$ and said fluorinating agent of the reaction vessel are irradiated by a combination of laser and ultraviolet sources.

22. A system as in claim 21 wherein the reaction vessel has a window which is optically transparent to energies produced by said laser and ultraviolet sources.

23. A system as in claim 20 wherein a number of said systems are cascaded in series in order to produce high purity $UF_6$.

24. A method as in claim 1 wherein said frequency number is about 24,000 $cm^{-1}$.

25. A method of purifying a $UF_6$ gas stream containing $UF_6$ molecules having fluoride impurities, the method comprising irradiating the $UF_6$ gas stream with laser radiation in a vessel in order to selectively convert at least a portion of the fluoride impurities in the gas stream to involatile products, removing the purified $UF_6$ gas stream from the vessel and separately removing the impurities from the vessel, said $UF_6$ gas stream being irradiated with the laser radiation having a frequency range of below about 24,000 $cm^{-1}$ wherein said $UF_6$ molecules are not dissociated by said laser radiation.

* * * * *